INVENTORS
J.W. ALEXANDER
A.R. CRANDALL

BY Hudson & Young

ATTORNEYS

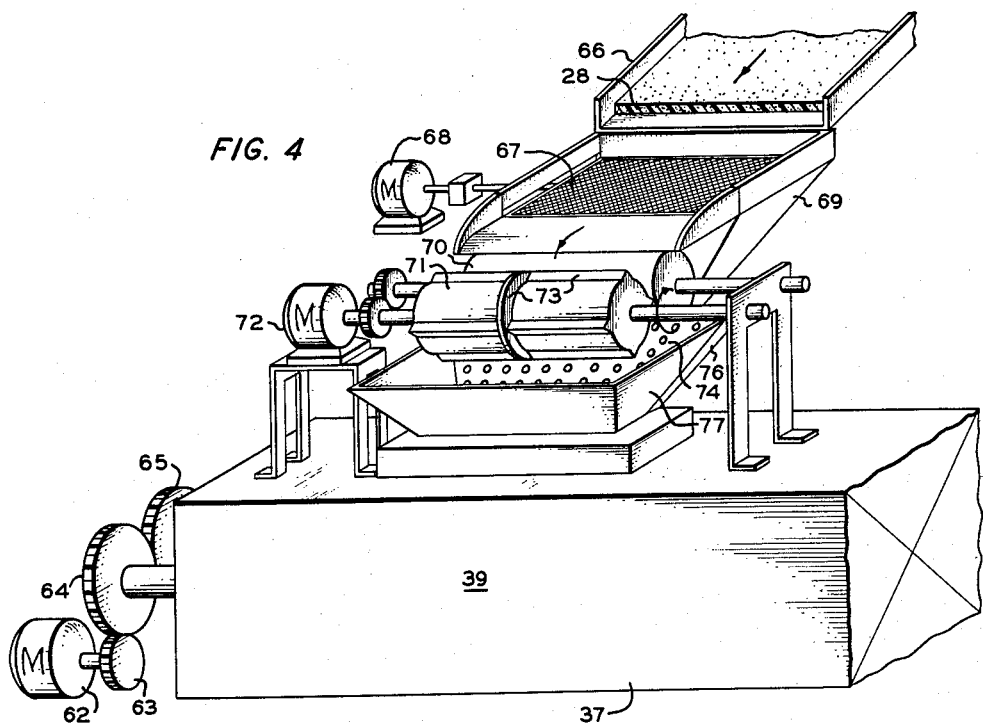
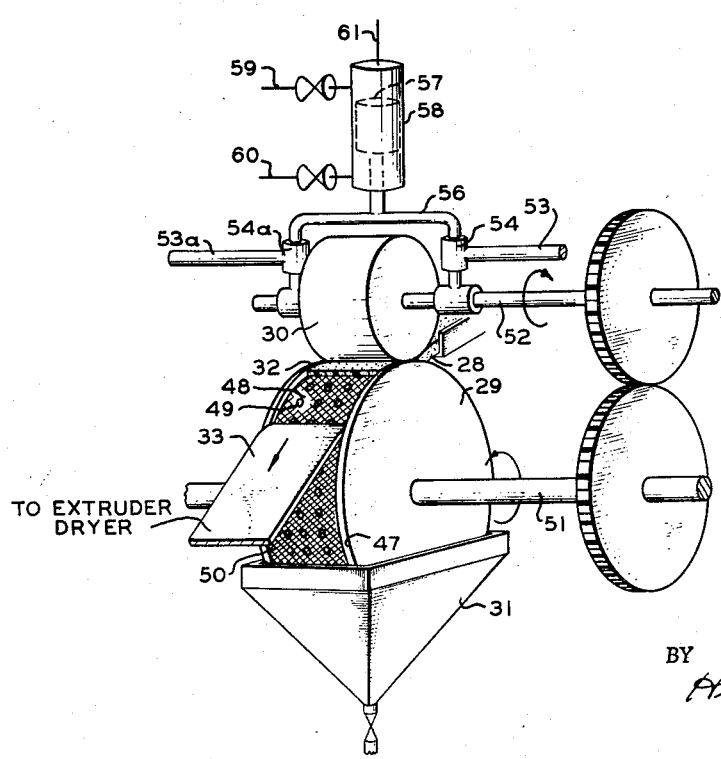

United States Patent Office 3,119,146
Patented Jan. 28, 1964

3,119,146
POLYMER DRYING PROCESS AND APPARATUS
A Ralph Crandall and James W. Alexander, Borger, Tex., assignors to Phillips Petroleum Company, a corporation of Delaware
Filed Jan. 31, 1958, Ser. No. 712,399
2 Claims. (Cl. 18—1)

This invention relates to an improved polymer drying process. In another aspect it relates to a method of handling and extrusion drying an emulsion polymerized rubbery polymer. In one of its more specific aspects this invention relates to a method of feeding coagulum of an emulsion polymerized rubbery polymer to the feed screws of an extrusion dryer. In another aspect this invention relates to appartus which is suitable for processing a slurry of emulsion polymerized polymer to a dry, rubbery product.

A highly successful method of drying synthetic rubber or other plastic compounds is by masticating the material in equipment employing rotating screws with flights of varying pitch and opposite pitch so that high pressures and temperatures are developed within the material by internal friction. In such equipment water is squeezed from the material being processed and following the severe mastication the pressure is suddenly reduced so that the heat produced in working the material vaporizes the remaining moisture. Equipment of this type, called an extrusion dryer, is manufactured by Welding Engineers, Incorporated, Morristown, Pennsylvania, and is fully described in the reissue patent of Lawrence J. Fuller, Re. 23,948, reissued February 15, 1955. When processing emulsion polymerized coagulum, a slurry of the polymer is passed over a screen to remove the bulk of the water and the wet coagulum is dropped into the feed screws of the extrusion dryer. The material is compressed or squeezed in the feed section of the machine to remove most (about 97 percent) of the water remaining with the coagulum, and the polymer is then forced into the following sections of the dryer barrel where the mastication referred to above takes place and the residual moisture is evaporated. The finished product generally contains about three-fourths percent moisture.

We have found that the capacity of an extrusion dryer can be greatly increased by squeezing the water from the polymer before it enters the feed screws of the dryer and then feeding to the dryer a compacted form of the coagulum as chunks, slabs, ribbon, or the like. When feeding coagulum to the extrusion dryer in this manner, the capacity of the dryer is unexpectedly increased beyond all proportion to the advantage gained by the removal of water in the compacting step. While the explanation for this is not certain, it is assumed that the grabbing power of the feed screws is improved by feeding the polymer in compacted form. A further improvement is noted in that the loss of polymer from the dryer in the form of fine particles is practically eliminated. So great has been the improvement in dryer capacity as a result of our new feeding method that in actual operating experience the dryer capacity was increased more than 100 percent and even exceeded design capacity. The process of our invention can be defined broadly as including the steps of filtering a slurry of polymer, compressing the polymer into a cake and thereby squeezing additional water from it, and passing the polymer in its compressed form into the feed section of an extrusion dryer. The apparatus by which we prefer to handle a slurry of rubbery coagulum includes, in combination with an extrusion dryer, two rolls mounted to receive and press the wet coagulum between the rolls and feed the compressed cake directly into the feed section of the extrusion dryer.

It is an object of our invention to provide a method of handling and drying a slurry of rubbery polymer.

It is another object of our invention to provide an improved method of feeding rubbery coagulum to an extrusion dryer.

Still another object is to increase the yield of an extrusion dryer with an improved method of feeding wet coagulum thereto.

Another object is to reduce the loss of polymer fines from an extrusion dryer.

Still another object of our invention is to provide apparatus in combination with an extrusion dryer for handling and drying a slurry of rubbery coagulum.

Other objects, advantages and features of our invention will be apparent to those skilled in the art from the following description, claims and drawing in which:

FIGURES 3 and 4 show in greater detail separate embodiments of preferred compacting means for our invention.

While a number of plastic materials can be worked in an extrusion dryer as above described, the advantages in increased yield and reduced losses accompany the processing of rubbery coagulum produced in emulsion polymerization processes for synthetic rubber. Coagulum of natural rubber latex can also be processed advantageously by our invention. Broadly, the synthetic polymers to which our invention applies are the synthetic elastomers such as are prepared by emulsion polymerization of conjugated dienes having from 4 to 8 carbon atoms per molecule or the copolymerization of mixtures of such conjugated dienes or the copolymerization of such a conjugated diene with a copolymerizable monomer containing the $CH_2=C<$ group. Copolymers of isoolefins and conjugated dienes in which the isoolefin has from 4 to 8 carbon atoms per molecule and is in a major amount and the conjugated diene has from 4 to 6 carbon atoms per molecule in a minor amount, known generally as butyl rubber can be employed in our invention. The synthetic elastomers which are preferred for processing in our invention are the butadiene-styrene copolymers, the butadiene acrylonitrile copolymers, polybutadiene, polyisoprene, polychloroprene, and the like.

An unexpected increase in dryer capacity has been observed when processing the coaglum of emulsion polymerized butadiene-styrene copolymer having a major amount of butadiene. The process of this polymerization and recovery steps which include our invention are shown schematically in FIGURE 1.

Figure 1:
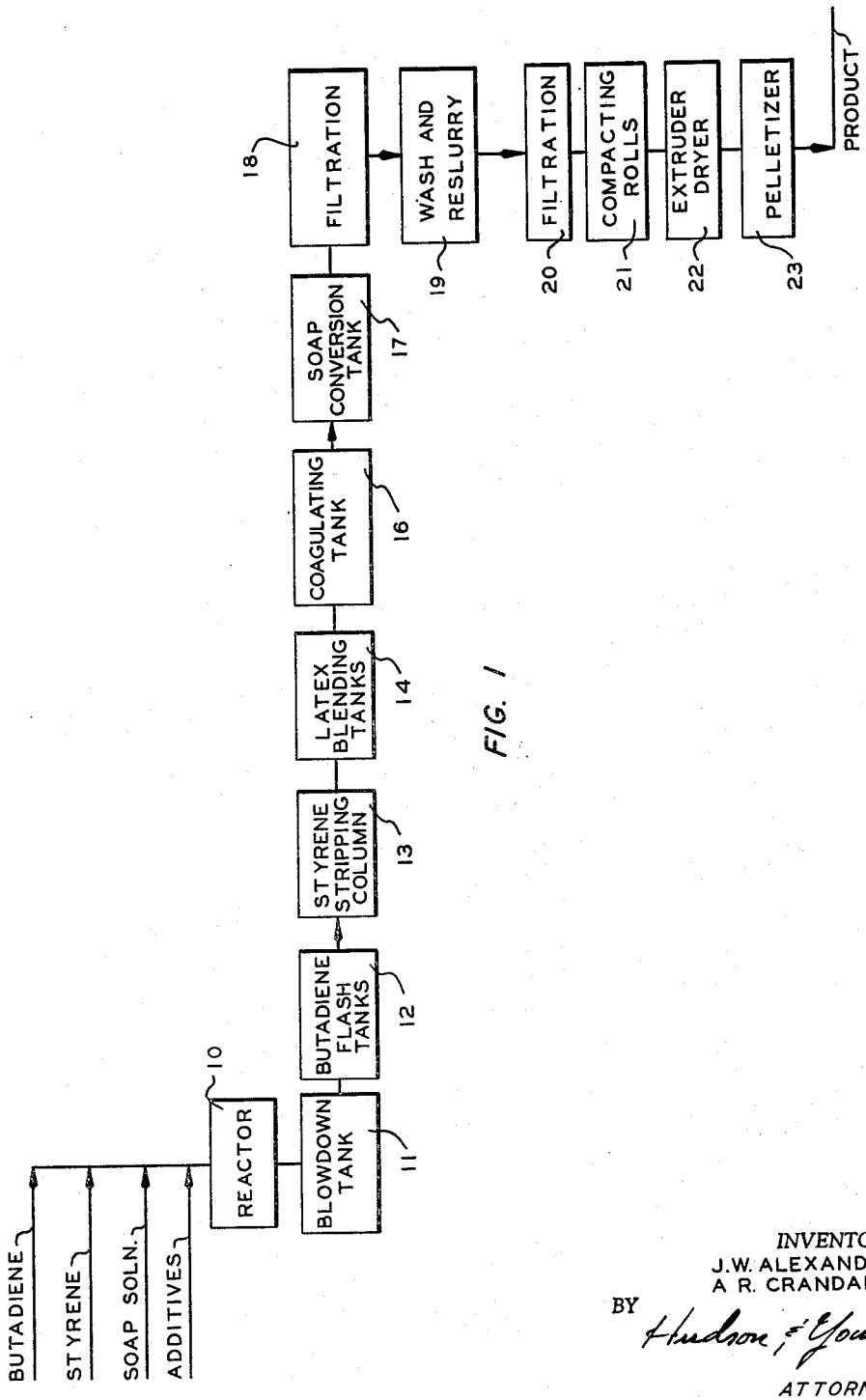
FIGURE 1 is a block flow diagram of a complete process for the manufacture of synthetic rubber from butadiene and styrene.

Referring to FIGURE 1, monomers of butadiene and styrene are fed to reactor 10 with a soap solution and various additives such as modifiers, oxidants and activators which are well-known in the synthetic rubber art. When the polymerization has progressed to the desired degree, the reaction mixture is passed to blowdown tank 11 and a shortstop is added to terminate polymerization. Unreacted butadiene is removed from the emulsion in tanks 12 and styrene is stripped from the mixture with steam in column 13. The latex is then passed to blending tanks 14 where an antioxidant is added.

To prepare a dry rubber product the latex is next coagulated in tank 16 with brine and acid and the emulsion is broken in soap conversion tank 17. The rubbery coagulum is filtered on a shaker screen 18 and the polymer is washed and reslurried in tank 19. The coagulum particles in the slurry thus formed have a particle size of about ¼ to 1½ inches in their maximum dimension and the slurry contains about 1 to 2 pounds of dry polymer per gallon.

The polymer slurry is filtered again by filtration step 20 and compacted according to our invention by rolls 21. The compacted coagulum is fed to the feed screws of extrusion drier 22 wherein the drying process as previously described takes place. As the polymer is extruded from dryer 22, it is pelletized by chopper 23 to its final form which contains less than three-fourths percent water.

In our invention the wet rubber crumb or coagulum is massed into solid chunks. Preferably, a blanket of coagulum about 1 to 2 inches thick and 10 inches wide is fed continuously into the feed screws of the extrusion dryer. Thus, rigid control of polymer coagulation to produce a large crumb is not necessary. This simplifies the process considerably.

Figure 2:
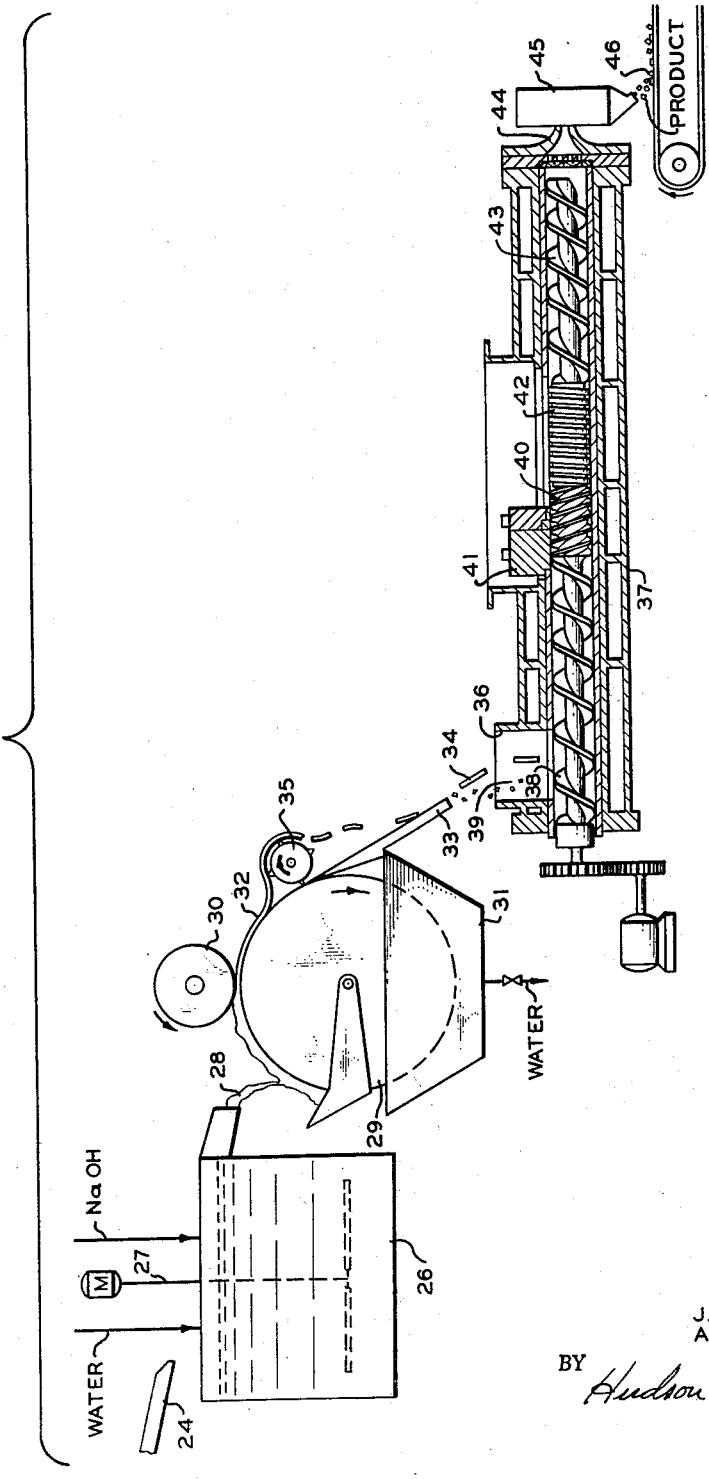
FIGURE 2 is a schematic diagram showing one embodiment of our invention in combination with an extrusion dryer.

A better understanding of our invention will be gained by referring to FIGURE 2. In FIGURE 2 a coagulum from the soap conversion operation is passed across vibrating screen 24 to reslurry tank 26. Water and sodium hydroxide are added in this step while agitation is provided with stirrer 27. The rubber crumb 28, having a specific gravity slightly less than 1, floats and overflows onto filter roll 29. The polymer is compacted by press roll 30 while the water drains through filter roll 29 into catch basin 31. Two press rolls can be used in series to form a firm cake without accumulating polymer ahead of the rolls. The compacted polymer 32 is cut into chunks and removed from filter roll 29 by rotary scraper 35 while remaining polymer adhering to the roll is shaved away by doctor knife 33. The chunks 34 of compacted polymer thus formed fall into feed hopper 36 of extrusion dryer 37. Rotary scraper 35 rotates at a higher peripheral speed and in the same direction as filter roll 29. Fexible tips, such as belting, on the scraper blades lift the cake from the roll surface and allow the cake to break into chunks or slabs. Polymer in this form is fed to the feed hopper of dryer 37 to improve the grabbing power of the feed screws. Scraper 35 can rotate in a direction opposite to the filter roll but the embodiment of FIGURE 2 is preferred. Generally, if scraper 35 rotates at a peripheral speed of about 2 to 3 times that of the filter roll, the cake is lifted smoothly from the filter, passes over the scraper, and breaks into slabs a few inches long. The scraper is preferably positioned at 90° from the top of the filter, but any position within 45° of this point is satisfactory. High pressure water sprays, not shown, can be used to clean the filter surface after removal of the cake. The compact chunks of polymer are grabbed by feed screws 38 in feed section 39. As the polymer is forced through the extruder dryer, it passes into compounding section 40 where reverse flights on the screw cause the pressures to increase greatly. The clearance between the screws and the wall of the dryer barrel can be regulated by pressure blocks 41 thereby controlling the degree to which the polymer is worked. The heat generated by the internal friction in the polymer is sufficient to vaporize moisture from the polymer in milling section 42 where the pressure is considerably reduced. Milling section 42 is frequently operated under vacuum. The polymer is then passed by extrusion worm 43 through die 44 where it is chopped by cutter 45 into pellets 46 as the final product.

The particular form in which the polymer is fed to the feed screws of the dryer can vary considerably provided the polymer is compact and in a particle size having a maximum dimension not less than one inch. Preferably the size of the chunks fed to the dryer should be not less than 2 or 3 inches in their maximum dimension and ½ to 2 inches in their minimum dimension. Considerable success has been obtained in feeding compact blocks of polymer from a blanket about 1 to 2 inches thick and 10 inches wide. A continuous ribbon can be fed to the dryer or fragments can be formed as shown in FIGURE 2.

The filtering and compacting apparatus of FIGURE 2 is shown in greater detail in FIGURE 3 as one suitable embodiment. The slurry of polymer crumb 28 is fed onto filter roll 29 which has sides which form a lip 47 defining the boundary of the surface 48 of filter roll 29. Perforations 49 covered by screen 50 permit the water from the slurry to drain through the roll into catch basin 31. As the filter roll 29 is rotated by a positive drive on shaft 51, the compacted coagulum 32 is removed by knife 33 positioned to feed the polymer directly into the feed section of the extruder dryer. Press roll 30 is also driven by direct drive on shaft 52 and is held in alignment with the filter roll by supports 53 and 53a having slip collars 54 and 54a holding bracket 56. The distance of press roll 30 from the filter roll 29 and the pressure exerted by the press roll against the coagulum cake is regulated by piston 57 in cylinder 58 having fluid pressure lines 59 and 60 and bleed line 61. In place of fluid under pressure in line 60, any biasing means, such as a helical spring can be used to support piston 57.

An alternative embodiment is shown in FIGURE 4 in which horizontally mounted compacting rolls feed directly into feed section 39 of extruder 37. Motor 62 having gear 63 drives gears 64 and 65 which are directly attached to the two oppositely rotating screws of the extruder 37. The polymer slurry 28 is fed by trough 66 onto shaker screen 67 which is driven by motor 68. Water passing through the screen is caught in basin 69 and the polymer crumb falls between rolls 70 and 71 which are driven by motor 72. Roll 71 is equipped with raised blades 73 which divide the compacted coagulum into fragments as it falls from between the rolls. Water pressed from the coagulum by rolls 70 and 71 falls onto perforated plate 74 and runs through the perforations into trough 76 while the compacted polymer falls into hopper 77 feeding directly into the receiving section of the extrusion dryer.

To further describe our invention, a specific embodiment will be discussed in connection therewith. This embodiment should be considered as exemplary only and should not be interpreted as limiting our invention unduly. A butadiene-styrene copolymer containing 23.5 weight percent bound styrene is processed from a polymer crumb having a nominal size of ¼ to 1½ inches to a dry, rubbery product. Slurry of copolymer in water is fed to a filter roll at the rate of 40 gallons per minute. The filter roll is 30 inches in diameter and has a peripheral surface 10 inches wide. The surface of the filter roll contains ⅜-inch perforations and is covered with a 24-mesh screen. Excess water drains through the filter roll as the polymer is retained on the screen and passes between the filter roll and a press roll which is set to form a compact cake 2 inches thick. The compact polymer containing 50 percent moisture falls into the feed screws of a Welding Engineers extrusion dryer equipped with two oppositely rotating 6-inch screws rotating at 300 revolutions per minute. As the polymer passes through the extruder dryer, it is subjected to extreme mastication which develops a temperature of about 300° F. Moisture is evaporated in a milling section operated at a vacuum of −10 to −12 inches of mercury and a dry, rubbery product containing ¾ percent moisture is extruded at a rate of approximately 3,000 pounds of rubber per hour on a dry basis.

As will be evident to those skilled in the art, various modifications of this invention can be made, or followed, in the light of the foregoing disclosure and discussion, without departing from the spirit or scope thereof.

We claim:
1. Apparatus suitable for drying wet coagulum of emulsion polymerized rubbery polymer comprising, in combination: an extrusion dryer having rotating worms adapted and arranged to receive material of the type described and volatilize moisture present therein with the heat generated by severe mastication of the material itself, a feed section, and a milling section, a first roll positioned to discharge material from its periphery into said feed section, a second roll spaced closely to said first roll and aligned therewith to compact against said first roll material passing between said rolls, said second roll having raised blades spaced across the surface thereof to divide the material compacted between said rolls into large fragments said first and second rolls being positioned in a horizontal plane above said feed section and conduit means for feeding slurried particulate material to said rolls.

2. Apparatus suitable for drying wet coagulum of emulsion polymerized rubbery polymer comprising, in combination: an extrusion dryer having two oppositely rotating worms adapted and arranged to receive material of the type described in a feed section and masticate said material in a compounding section to generate heat within said material and volatilize moisture therefrom in a milling section, a large diameter filter roll having a relatively narrow peripheral surface and sides which extend to form a lip bounding said peripheral surface, said surface being perforated and covered with a screen, a rotary scraper bearing against said surface for lifting material therefrom, said filter roll and rotary scraper being positioned to deposit compacted material removed by said scraper in said feed section of said extruder dryer, a press roll having a diameter smaller than said filter roll and a width equal to said peripheral surface of said filter roll, fluid pressure means holding said press roll in spaced relation to said filter roll so that material passing between said rolls is compressed and water forced out of said material, a trough below said filter roll to receive water removed from said material, and conduit means for feeding an aqueous slurry of said material in particle form onto said filter roll.

References Cited in the file of this patent

UNITED STATES PATENTS

| Re. 21,390 | Grote | Mar. 12, 1940 |
| Re. 23,948 | Fuller | Feb. 15, 1955 |
| 1,731,537 | Krause | Oct. 15, 1929 |
| 1,980,898 | Abernethy | Nov. 13, 1934 |
| 2,040,770 | Grote | May 12, 1936 |
| 2,371,722 | Wanderer | Mar. 20, 1945 |
| 2,691,796 | Emig | Oct. 19, 1954 |
| 2,664,605 | Beste | Jan. 5, 1954 |
| 2,700,177 | Mottet | Jan. 25, 1955 |
| 2,730,933 | Reynolds | Jan. 17, 1956 |
| 2,755,509 | Smidth | July 24, 1956 |
| 2,856,635 | Gerson et al. | Oct. 28, 1958 |
| 2,935,763 | Newman et al. | May 10, 1960 |

FOREIGN PATENTS

| 308,626 | Great Britain | Mar. 25, 1929 |
| 465,922 | Great Britain | May 18, 1937 |